United States Patent [19]
Douglas

[11] 3,952,312
[45] Apr. 20, 1976

[54] EXPOSURE CONTROL SYSTEM FOR PHOTOGRAPHIC APPARATUS

[75] Inventor: Lawrence M. Douglas, South Easton, Mass.

[73] Assignee: Polaroid Corporation, Cambridge, Mass.

[22] Filed: Dec. 20, 1974

[21] Appl. No.: 534,733

[52] U.S. Cl. .................................. 354/29; 354/30; 354/59; 354/196; 354/230
[51] Int. Cl.² .......................................... G03B 7/16
[58] Field of Search ............ 354/196, 230, 149, 29, 354/30, 59, 36, 139

[56] References Cited
UNITED STATES PATENTS

| | | | |
|---|---|---|---|
| 3,433,144 | 3/1969 | Ivester | 354/139 |
| 3,832,722 | 8/1974 | Douglas | 354/29 |

*Primary Examiner*—Robert P. Greiner
*Attorney, Agent, or Firm*—Edward S. Roman

[57] ABSTRACT

A photographic camera apparatus of the type adapted for selective use with a source of artificial illumination includes a follow focus system embodying an interceptor which is selectively movable into the locus of travel of an exposure mechanism while at the same time being translatably positionable in correspondence with camera focusing along an elongated linear pathway for halting an exposure mechanism at locations corresponding to select exposure apertures as defined by the exposure mechanism. Trim means are additionally connected to the elongated pathway along which the interceptor means is translatably disposed to angularly shift the elongated pathway and its associated interceptor in a manner whereby a select exposure aperture may be changed by a predetermined number of F/stops regardless of camera focus.

27 Claims, 10 Drawing Figures

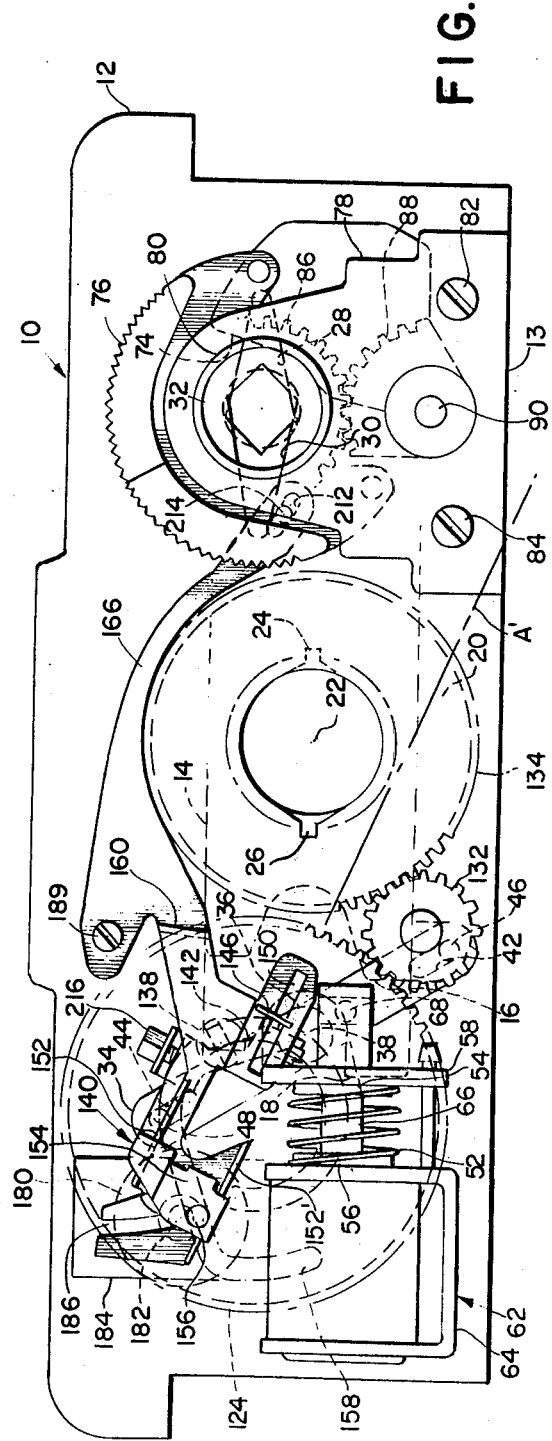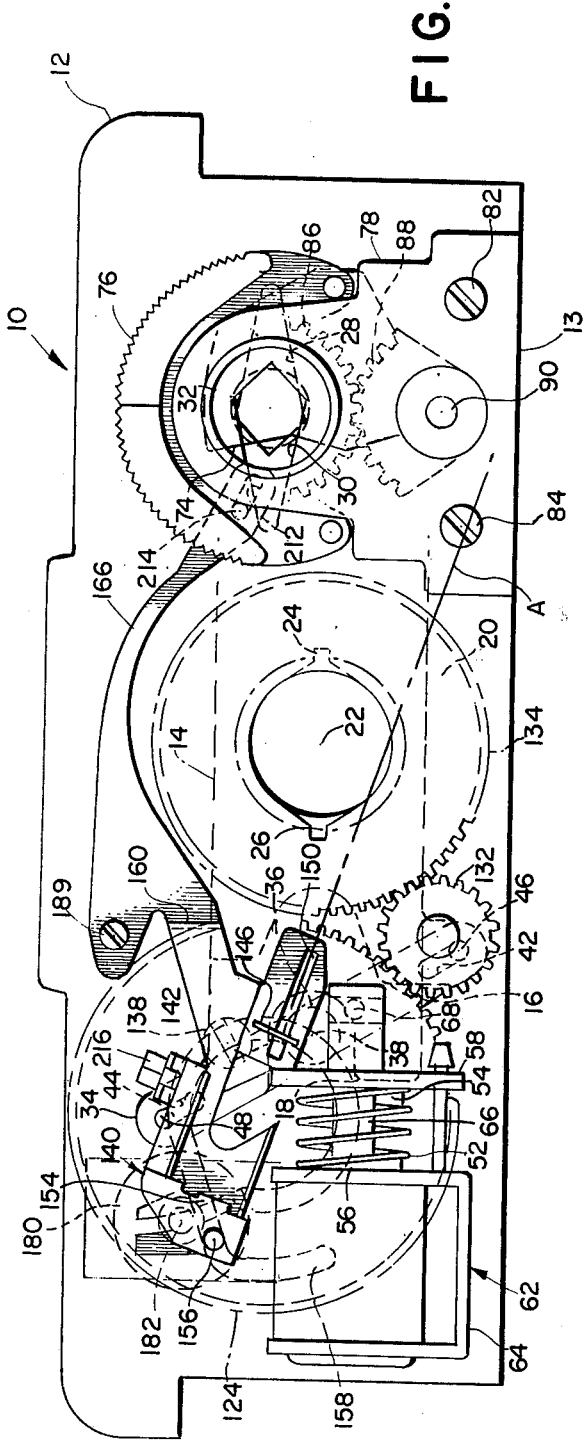

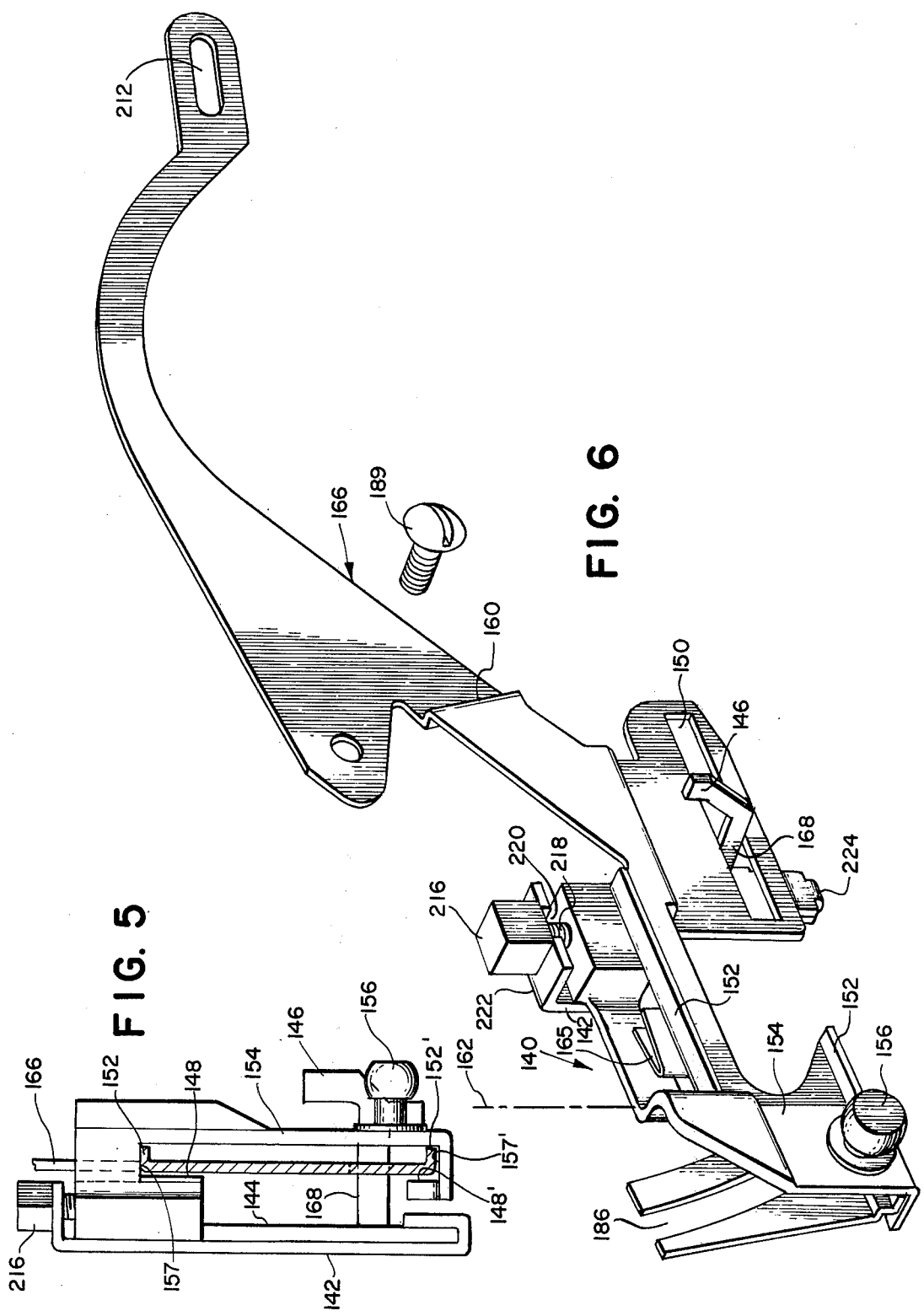

EXPOSURE CONTROL SYSTEM FOR PHOTOGRAPHIC APPARATUS

BACKGROUND OF THE INVENTION

When operated in conjunction with flash or transient illumination, the exposure mechanism of a photographic camera usually is adjusted in accordance with the levels of illumination anticipated at a scene being photographed. To anticipate these levels, an evaluation is made based upon an application of the inverse square law of light energy propagation. Under this law, the light energy available from a given source is considered to vary inversely with the square of the distance from that source. Accordingly, to make an appropriate exposure mechanism adjustment for flash photography, light source-to-subject distance is derived and the value of this distance is utilized to compute an appropriate exposure value or illuminational factor.

In some camera designs, exposure control adjustment for flash operation is effected automatically by incorporating within the apparatus what is termed as a "follow-focus" system. With a follow-focus arrangement, aperture adjustment or flash illumination output control is mechanically coupled with the range finding or focusing system of a camera. In effect, a follow-focus control represents a second exposure control system for a camera. As such, its presence necessarily contributes to the size and complexity of a camera.

Where aperture is adjusted as a follow-focus procedure, the exposure control housing of a camera must incorporate one aperture adjustment mechanism for daylight regulation as well as another control system which is operative exclusively for flash illuminated exposures and which does not otherwise interfere with the daylight exposure regulating system. Providing such dual regulating systems within a fully automated camera and, particularly, a camera which is of such thin and compact design as to be conveniently carried within a pocket of a garment poses complex design considerations.

In one fully automated but thin and compact camera described in U.S. Pat. No. 3,714,879, an exposure control system is described wherein both aperture and exposure interval are automatically varied in accordance with scene lighting conditions. This exposure control system operates in conjunction with a single lens reflex viewing system as well as with a motorized form of automatic film processing. Exposure regulation within the thin, fully automated but compact camera takes place as part of a multi-step program involving the conversion of an optical path between viewing and exposure operational modes.

The shutter-aperture components of the exposure mechanism of the noted reflex camera are normally open for viewing and focusing and are energized to close the taking aperture both for operational mode conversion as well as for terminating exposure interval. An optimized automatic weighting of aperture and exposure interval in accordance with a predetermined program is derived with the control system through the use of a progressively varying aperture movement during any given exposure interval.

A follow-focus control technique for such an exposure control system is described in a U.S. patent entitled, "Focus Responsive Exposure Control System," by Vaito K. Eloranta and Edwin K. Shenk, U.S. Pat. No. 3,750,543, issued Aug. 7, 1973, and assigned in common herewith. The latter application describes a second flash mode control system wherein an electromagnetic device such as a solenoid is selectively maneuvered and energized to extend its plunger and arrest the position of exposure-aperture blades in accordance with focal setting.

A complete follow focus system is described in a U.S. patent entitled, "Apparatus and System for Flash Photography" by Lawrence M. Douglas, issued Aug. 27, 1974, U.S. Pat. No. 3,832,722, and assigned in common herewith. This follow focus system achieves the necessary compactness to meet the overall camera design of the above described variety so as to incorporate both exposure control features within a very compact and thin exposure housing. The above follow focus system additionally provides a "trim" function to accommodate for slight variations in the sensitometric characteristics of the film as well as to insert a modicum of personal or overriding control over the automated system. The trim control has only one control element for operation in this manner reducing the possibility that a camera operator may become confused or overlook a requirement for providing a trim control for that mode of operation which he is currently using.

It is therefore a primary object of this invention to provide for an improved follow focus system of the above described type for a photographic camera apparatus including a uniform trim control whereby a select exposure aperture may be adjusted by a predetermined number of F/stops regardless of the actual camera focus.

It is also an object of this invention to provide an improved follow focus system for photographic camera apparatus which system may be finely adjusted to compensate for the cumulative effect of dimensional variations in the individual components.

It is a further object of this invention to provide an improved follow focus system for a photographic camera apparatus having a trim control adjustable to change a select apparatus opening by a uniform amount regardless of the actual select aperture value as determined by the follow focus system during lens focusing.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

The invention herein described and claimed relates to a photographic apparatus of the type adapted for selective use with a source of artificial illumination having a predetermined output intensity characteristic. The photographic apparatus includes a lens means adjustable to focus the image of a photographic subject positioned at a given distance therefrom along an optical path at an image plane. Focusing means are provided for movement between one terminus representing a distant focus and another terminus representing a nearest focus for adjusting the lens means. Exposure mechanism means having at least one element movable along a locus of travel are additionally provided to define a range of apertures over the optical path when the element is moved. Interceptor means may be selectively moved into the exposure mechanism means locus of travel and translatably positioned along an elongated linear pathway for halting the exposure element at locations wherein the exposure mechanism means defines select exposure apertures. Guide means also move in correspondence with the focusing means movement to position the interceptor means in accordance with the intensity of the source of artificial illumination anticipated at the photographic subject. Drive means are provided to selectively move the interceptor means into the locus of travel during a photographic cycle of the apparatus. Trim means may also connect to the elongated pathway along which the interceptor means is translatably disposed wherein the trim means may be selectively moved independently of the focusing and follower means for adjusting the exposure aperture by angularly shifting the elongated pathway in a manner which operates to change the position of the interceptor means at which the exposure mechanism element is halted.

The trim means includes a trim link selectively rotatable about a fixed point of pivot to change the angle of the elongated linear pathway along which the interceptor means is translatably disposed by a predetermined number of degrees substantially corresponding to a predetermined change in exposure aperture F/stop regardless of the adjusted position of the focusing means.

The interceptor means may additionally include an arresting link adjustably connected thereto wherein the interceptor means and its associated arresting link are selectively movable into the exposure mechanism means locus of travel and translatably positionable along the elongated linear pathway so that the arresting link can halt movement of the exposure mechanism at locations defining select exposure apertures. The position of the arresting link relative to the interceptor means may also be finely adjusted to compensate for the cumulative effect of dimensional variations in the individual components.

BRIEF DESCRIPTION OF THE DRAWINGS

For a fuller understanding of the nature and objects of the invention, reference should be had to the following detailed description taken in connection with the accompanying drawings.

FIG. 1 is a front sectional view of an exposure control mechanism according to the invention showing the orientation of components thereof during an exposure interval when the trim control is adjusted for minimum aperture;

FIG. 2 is a front sectional view of the exposure mechanism of the invention showing the orientation of components thereof during an exposure interval when the trim control is in the neutral position;

FIG. 5 is a side view partially in cross-section of the assembled portion of the exposure mechanism of FIG. 6;

FIG. 6 is a perspective view of an assembled portion of the exposure mechanism of FIG. 1;

DETAILED DESCRIPTION OF THE DRAWINGS

The apparatus and system of the present invention are ideally suited for incorporation within a fully automated single lens reflex camera. To perform in reflex fashion, these cameras include a reflexing mirror or operator assembly which is normally retained in a viewing mode orientation permitting a scene to be framed and focused at a viewing surface thereon while covering film at the exposure plane of the camera within which it is located.

To derive adequate lighting for purposes of viewing and focusing, the exposure control arrangement maintains a full aperture opening and open shutter until a photographic cycle is commenced. When a camera is actuated to start such a cycle, the shutter is fully closed to secure its exposure chamber while the reflex arrangement is moved into its exposure orientation uncovering the exposure plane. Following this maneuver, an exposure is made after which the shutter is again held fully closed while the reflex assembly is returned to its initial viewing mode orientation. As this orientation is again reached, maximum aperture width is reestablished and the shutter is opened to provide for viewing and focusing in preparation for a subsequent photographic cycle.

A reflex photographic camera having components operating under the above cataloged program is described in detail in U.S. Pat. No. 3,672,281. The camera structure described therein particularly is notable for its thin and compact structure, suiting it to be conveniently carried in the pocket of a garment.

The exposure regulator preferred for incorporation in this camera is one which also is ideally suited to be confined within an exposure housing of restricted dimension in keeping with the compact structure of the camera. Described in detail in U.S. Pat. No. 3,641,889, the exposure regulating system is formed as a two-bladed shutter-aperture mechanism which is driven between relaxed and energized conditions for selectively blocking light along the optical path of a camera. The noted exposure mechanism also provides for automatic exposure control utilizing a light sensitive network and solenoid actuated drive which combine to provide a programmed weighting of aperture and exposure interval for that range of scene brightnesses most commonly encountered in conventional photographic practice.

Figure 4:
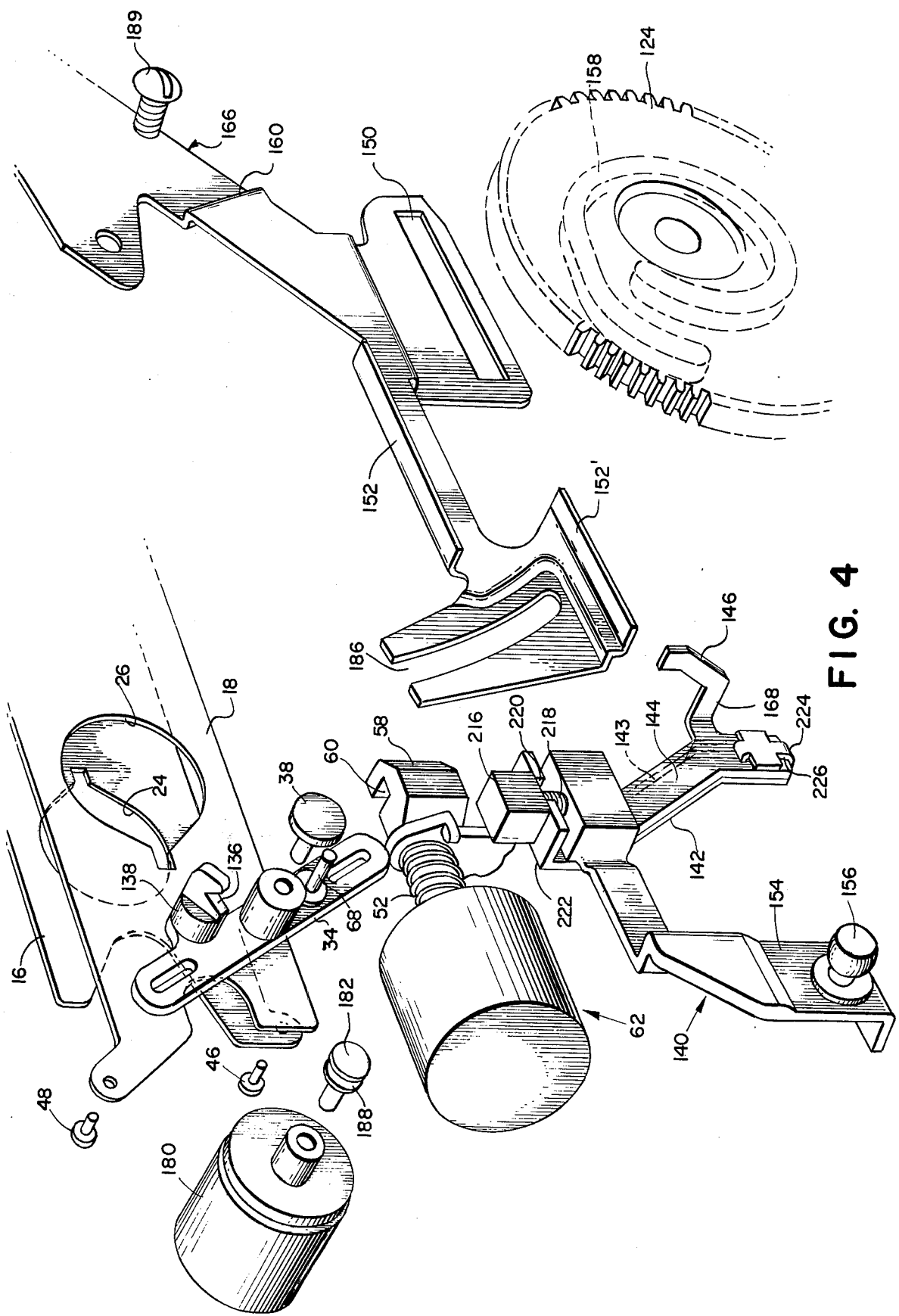
FIG. 4 is an exploded perspective view of portions of the exposure mechanism of FIG. 1.

Referring to FIG. 1, the basic components of this shutter-aperture mechanism are revealed in detail as they are present within a compact exposure housing 10 of relatively thin front-to-back dimension. Mounted upon a rear casting 12, the exposure mechanism, shown generally at 14, is formed having two cooperatively moving shutter-aperture blades 16 and 18. Blades 16 and 18 slide horizontally within a mount (not shown) forming part of the lens housing 20 of an optical objective 22 defining the entrance of the optical path of the camera. Referring additionally to FIG. 4, each of the blades, 16 and 18, is formed having a selectively shaped aperture opening, respectively depicted at 24 and 26, movable across the optical path of the camera at 22. Depending upon the position of blades 16 and 18, aperture openings 24 and 26 symmetrically overlap over the optical path to define selectively varying aperture sizes. Each blade, 16 and 18, additionally is configured having a selectively configured and corresponding photocell sweep opening, respectively depicted at 28 and 30. Openings 28 and 30 are configured in correspondence with the contours of respective aperture openings 24 and 26. The openings 28 and 30 move with mutual symmetry over the optical path of a small entrance lens 32 providing for the passage of light from the scene being photographed to a photosensing element of a light sensitive control circuit.

Blades 16 and 18 define a continuous progression of apertures over the optical path at 22 as a result of their mutual connection with a walking beam as shown at 34. Walking beam 34 is formed having a centrally disposed hub portion 36 which is journaled for rotation about an upstanding stud (not shown) fixed within and extending from rear casting 12. A pin 38 secures the hub portion 36 over the above-noted upstanding stud. Elongate slots, as at 42 and 44, are formed in the outward tip portions of beam 34 for the purpose of providing connection with pins 46 and 48 extending, respectively, from blades 16 and 18.

Thus interconnected, the blades 16 and 18 move simultaneously and in correspondence with each other to define a continuous progression of symmetrically configured variable aperture openings over the camera optical path at 22 as well as over the photocell light path at 32. Elongate slots 42 and 44 serve the function of accommodating the horizontally restricted movement of blades 16 and 18 along a cord through the locus of rotation of the tips of beam 34.

Movement of blades 16 and 18 from their normally open orientation into a closed orientation blocking the passage of light along the optical path 22 of the camera is carried out by a tractive electromagnetic drive operative to provide a driven mode of operation. This electromagnetic drive is present as a solenoid 62 mounted upon rear casting 12 by a bracket 64. Solenoid 62 is of somewhat conventional design, having an internally disposed cylindrical plunger 66 which retracts inwardly into its spiral winding and associated casing upon energization thereof. When solenoid 62 is so energized, walking beam 34 is rotated rapidly to move blades 16 and 18 into closed orientation whereupon the entrance opening at 22 of the taking lens optical path of the camera is completely closed.

Beam 34 is biased for rotation in a manner wherein aperture openings 24 and 26 of respective blades 16 and 18 define a relative aperture of maximum dimension over the optical path at 22 when solenoid 62 is de-energized. This bias is derived from a spring 52, the central portion of which is wound about plunger 66. The movable end 54 of spring 52 is configured for biased contact against a plunger end cap 58, while its stationary end 36 is configured to abut against the bracket 64 extending from rear casting 12. With spring 52 so connected, the exposure mechanism is biased for movement into a normally open orientation when in its relaxation mode of operation as illustrated in FIG. 1. Rotatable connection is also provided between plunger end cap 58 and walking beam 34 by a pin shown at 68.

Figure 3:
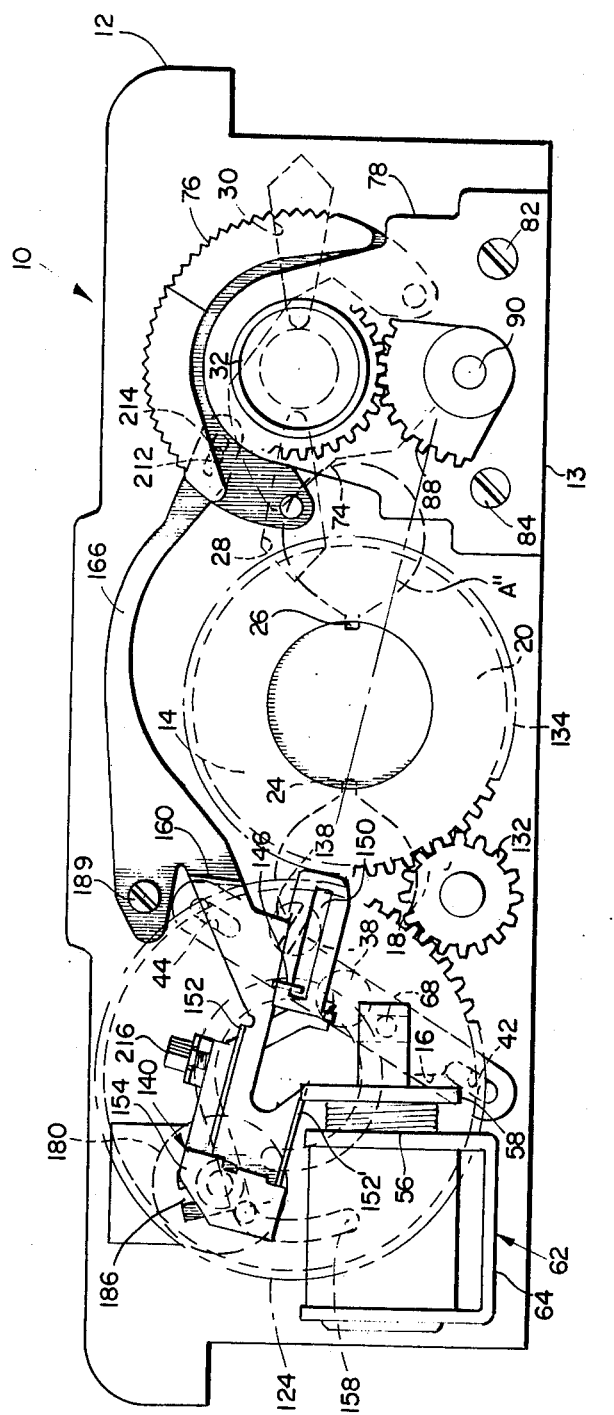
FIG. 3 is a front sectional view of the exposure mechanism of the invention showing the orientation of the components thereof during a non-exposure interval when the trim control is in the position for maximum aperture.

Following conversion of an associated reflex camera to an exposure configuration, an exposure interval commences with the de-energization of solenoid 62 following its energization to fully close shutter-aperture blades 16 and 18 as depicted in FIG. 3. With this de-energization, drive spring 52 moves blades 16 and 18 to progressively enlarge the aperture over optical path 22. Simultaneously, photocell sweep openings 28 and 30 define a corresponding progressively enlarging aperture opening over the photocell opening at 32. When an appropriate amount of light is received through window 32 to trigger a control circuit, solenoid 62 is again energized to rapidly close blades 16 and 18, thereby terminating an exposure interval. The latter energization of solenoid 62 continues until such a time as the reflex camera has reassumed its viewing and focusing mode orientation.

With the ambient operation thus described, relative aperture as well as exposure interval are selectively weighted for any given level of scene brightness so as to optimize the selection of exposure interval and aperture. To trim this ambient performance of the exposure system, an optical wedge 74, having selectively variable transmissive properties, is pivotally manipulated before the photocell positioned rearwardly of lens 32. Adjustment of the position of wedge 74 is carried out by manually rotating a semi-circular trim wheel 76 from its uppermost serrated edge. Trim wheel 76 is rotatable about opening 32 by virtue of its journaled connection with a mounting plate 78 at annular opening 80. Mounting plate 78 is attached to rear casting 12 by screws as at 82 and 84. The lowermost portion of trim wheel 76 is formed having a gear segment 86 which is meshed with a corresponding gear segment 88 formed within the lower portion of wedge 74. Wedge 74 is pivotally mounted within the assembly upon a stud 90 extending from rear casting 12. Accordingly, rotation of wheel 76, in turn, selectively drives wedge 74 from its gear segment 88 through gear segment 86.

Manipulation of trim wheel 76 will selectively move optical wedge 74 across opening lens 30 to adjust the amount of light permitted to enter the light sensing network through cell sweep openings 28 and 30. Given trim orientations for the assembly are depicted in FIGS. 1–3. Appropriate indicia may be positioned upon the housing 10 to aid the camera operator in inserting an appropriate amount of trim or exposure value adjustment.

Figure 9:
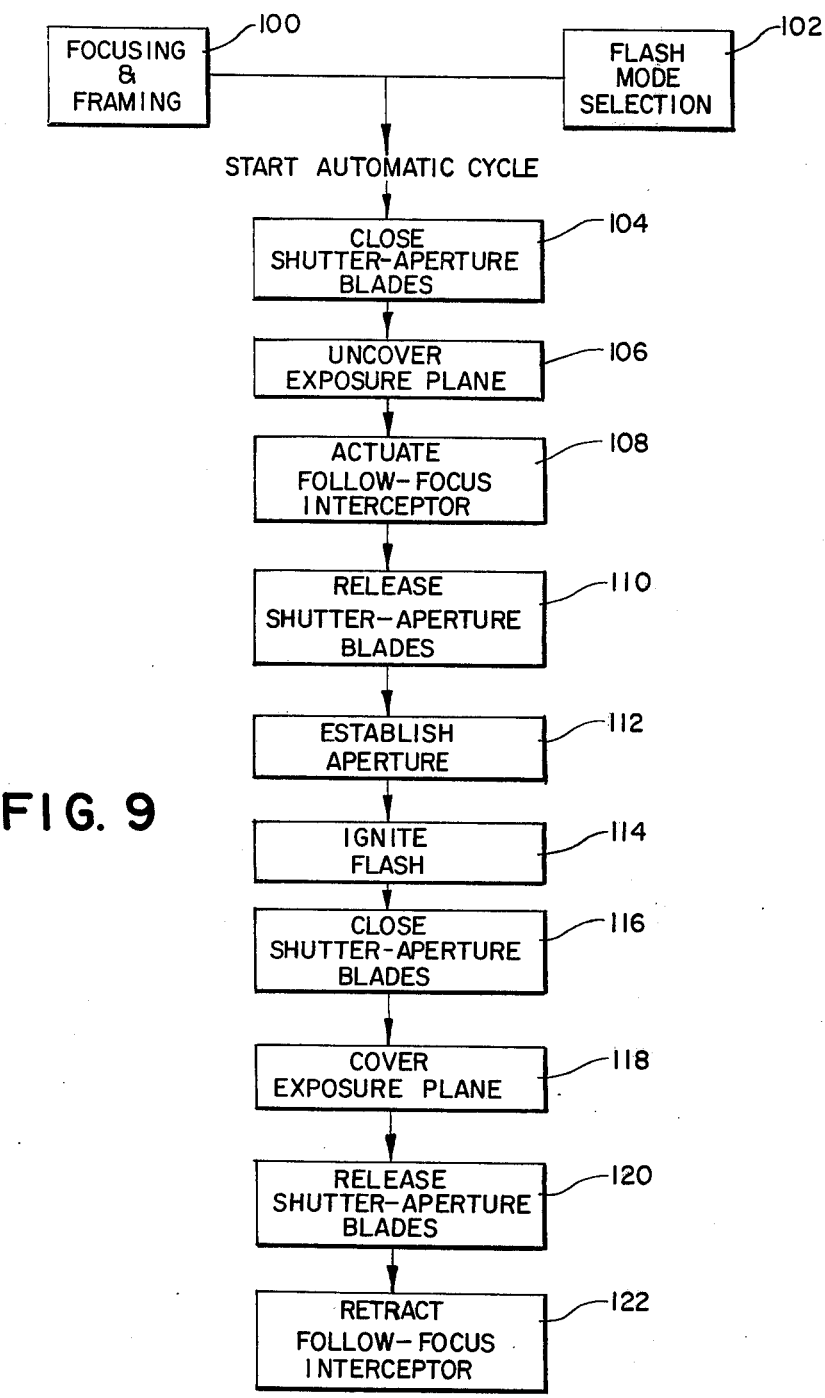
FIG. 9 is a block diagram depicting an exposure cycle of the exposure control system of the invention.

Referring to FIG. 9, the sequence of operational events occurring during flash performance of a reflex camera incorporating the subject exposure system is depicted. For instance, following focusing and framing as depicted at block 100 as well as conversion of the camera to flash mode performance as indicated at 102, an automatic cycle is commenced with the depression of a start button or the like. Pressing the start button causes the shutter aperture blades 16–18 to close as depicted at 104. The blades 16 and 18 are held closed at least until the exposure plane of the camera is fully uncovered as indicated at 106. Following the uncovering of the exposure plane as at 106 and while the shutter-aperture blades 16–18 remain closed, a follow-focus interceptor function is actuated as depicted at 108. Solenoid 62 is then de-energized to release the shutter-aperture blades 16–18 as depicted at 110. Blades 16 and 18 are driven by spring 52 to progressively open the aperture over the optical path at 22 until they are intercepted to establish an aperture as indicated at 112. Once aperture is established, a flashlamp is ignited as depicted at 114, following which solenoid 62 is again energized to close the shutter-aperture blades 16–18 as indicated at 116. While blades 16 and 18 remain closed, the exposure plane of the camera is again covered as depicted at 118, following which solenoid 62 is again de-energized to release shutter-aperture blades 16–18 for movement to define a maximum aperture width as depicted at 120. As the foregoing release 120 occurs, the interceptor function is retracted from the path of blades of 16 and 18 as shown at 122.

Figure 7:
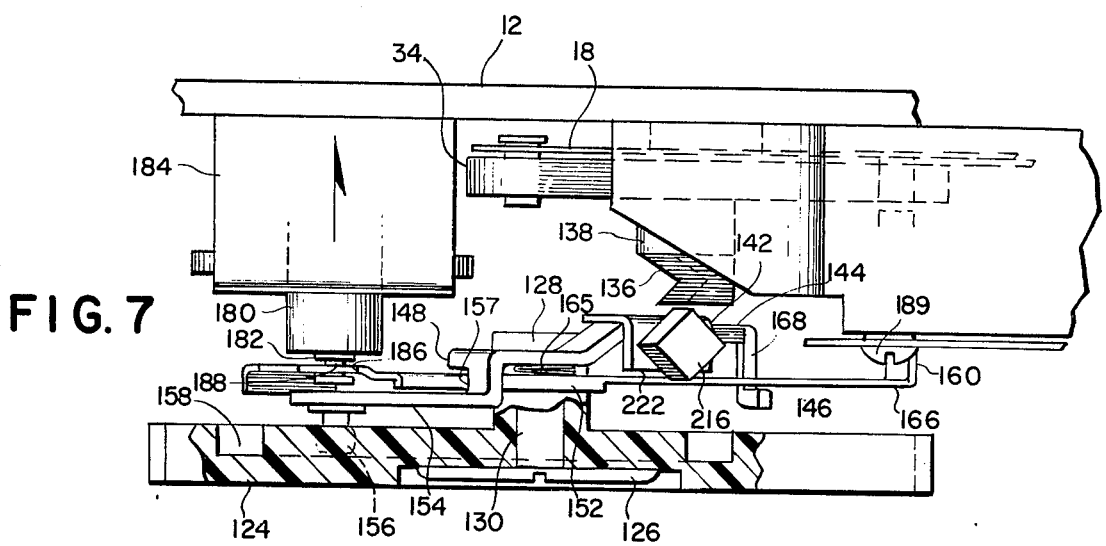
FIG. 7 is a plan view partly in cross-section of a portion of the exposure mechanism of the invention of FIG. 1.
Figure 8:
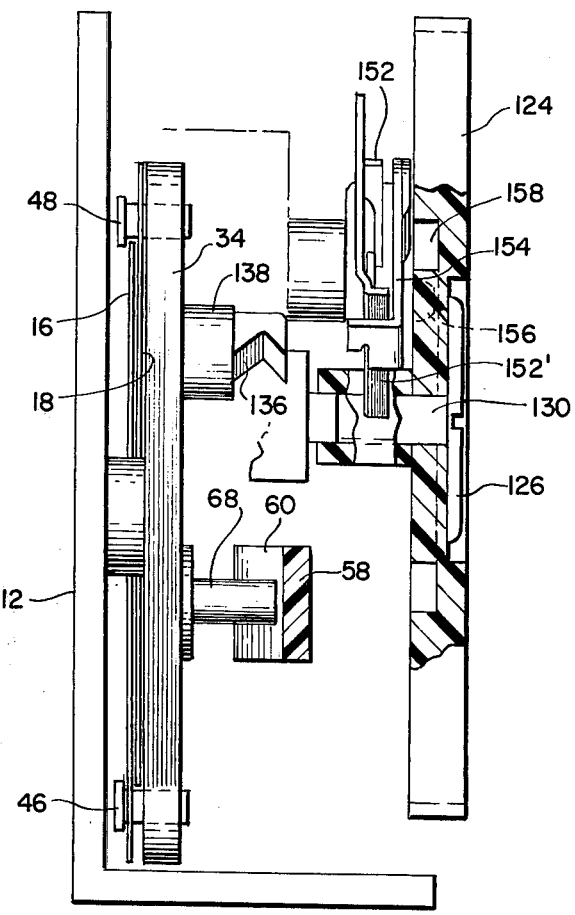
FIG. 8 is a side view partly in cross-section of a portion of the exposure mechanism of the invention of FIG. 1.

The follow-focus interceptor functionally described in connection with blocks 108 and 122 operates in conjunction with the focusing components of the camera. Referring additionally to FIGS. 7 and 8, a manually rotatable focus wheel 124 is shown mounted upon a pivot screw 126 along one side of exposure housing 10. Screw 126 is threadably connected at 128 to an integral standoff from rear casting 12, extending both through focus wheel 124 and a focus wheel bushing 130 disposed between wheel 126 and threaded connection 128. Focus wheel 124 is formed having peripherally disposed gear teeth. These teeth are meshed with the teeth of an idler gear 132 which, in turn, is in driving connection with the external gear teeth of a cylindrical bezel assembly 134 retaining optical objective 22. A detailed description of assembly 134 is set forth in a co-pending application of United States Patent by Rosario J. Messina entitled, "Adjustable Lens Mounting," filed Dec. 28, 1970, Ser. No. 101,745, and assigned in common herewith (now abandoned). Bezel 134 is rotatable from focus wheel 124 to provide objective lens focusing and, as may be apparent, the rotational orientation of focus wheel 124 continuously corresponds with the focus setting of the lens system.

Looking additionally at FIGS. 4, 5 and 6, walking beam 34 is formed supporting a follow-focus striker pin 138 at the forward edge of its upper side. Pin 138 moves through a predetermined arcuate locus of travel as blades 16 and 18 are driven either under the bias of spring 52 or from the plunger 66 of solenoid 62. For follow-focus operation, the movement of walking beam 34 along its locus of travel establishing increasingly widening apertures is selectively arrested to establish a predetermined focus responsive apertural value. Motion arrest is provided generally by a follower linkage which includes, inter alia, a slider assembly 140 which is selectively positioned within the above-noted locus of travel so as to contact striker pin 138 to halt the exposure mechanism as it moves under the bias of spring 52. Contact with striker pin 138 is effected by a downwardly extending arresting link 142 adjustably connected to slider assembly 140. Relative positioning of slider assembly 140 and its associated link 142 within the locus of travel of striker pin 138 is provided by virtue of its sliding connection through an upturned stop link member 146 and tangs 148, 148' with a trim link 166. Sliding connection is established by link 146 passing through an elongated slot 150 in trim link 166 together with tangs 148, 148' slidably engaging respective edge portions of a pair of longitudinal rails 152, 152' which extend laterally from the trim link 166 and extend respectively between tangs 148, 148' and wall portion 154 of interceptor assembly 140.

As is readily apparent, longitudinal rails 152, 152' slidingly engage respective horizontal edge portions 157, 157' of slider assembly 140 and thus inhibit vertical movement of slider assembly 140 with respect to trim link 166.

Slider assembly 140 is operatively associated with the rotational orientation of focus wheel 124. This association is provided by the connection of a follower 156 extending from assembly 140 and slidably driven in positive fashion by a face-groove cam 158 formed within the inward face of focus wheel 124. Selective restriction of sliding movement of assembly 140 with respect to trim link 166 is established by the ends of slot 150 engaging link 146. It should be readily appreciated that the slider assembly 140 and its associated arresting link 142 as well as trim link 166 are formed as relatively thin stampings which are capable of closely nesting in juxtaposition to the internal face of focus wheel 124. As such, these components require a minimum of front-to-back packaging volume. It should be further appreciated that the trim link 166 is made of resilient material such as copper in order to spring back to its characteristic stamped shape when flexed.

Referring to FIG. 4, an arrangement for enabling or actuating the following focus system, and more particularly, arresting link 142 is revealed in more detail. Link 142 is selectively movable into the arcuate locus of travel of striker pin 138 as a result of its connection to trim link 166 thru slider assembly 140. Inasmuch as this interceptor must be removed from the noted locus of travel of pin 138 during select portions of the flash mode photographic cycle as well as throughout an ambient mode cycle, it is biased to retract forwardly toward the back surface of focus wheel 124. This bias is provided by the trim link 166 which is resiliently loaded about the bend 160 to spring forward into engagement with the back surface of focus wheel 124. In this manner, slider assembly 140 and its associated follower 156 are spring loaded against the back surface of focus wheel 156 with ultimate movement terminated by engagement of the forward tip of the follower 156 against the back surface of face groove cam 158. The step of retracting the follow focus system in the series of events taking place during a flash mode operation of a photographic cycle has been discussed in connection with block 122 of FIG. 9.

Actuation of the follow-focus interceptor as described at 108 in FIG. 9 is provided by select energization of a tractive electromagnetic drive. Looking to FIGS. 4 and 7, this electromagnetic drive is illustrated as comprising a solenoid 180 having an internally disposed plunger 182 which is retractable within the solenoid upon energization thereof. Solenoid 180 is mounted in stationary fashion upon rear casting 12 by a bracket 184. The outwardly extending tip of solenoid plunger 182 is slidably connected to an open ended curvilinear slot 186 in the trim link 166. Connection with slot 186 is made by a circumferential slot 188 around the tip of plunger 182 in a manner whereby the tip of plunger 182 engages the edge portions of slot 186 in overlapping fashion. Thus the trim link 166 together with its associated slider assembly 140 and arresting link 142 may be moved inwardly or outwardly upon respective actuation and deactuation of the solenoid 180. Additionally, the solenoid plunger 182 may be moved along the curvilinear slot 186, in a manner to be subsequently described, without the plunger 182 disengaging from the slot 186. The slidable connection is maintained throughout the focus and trim adjustment.

When solenoid 180 is energized, its plunger 182 is retracted internally to, in turn, pivot trim link 166 and its associated slider assembly 140 inwardly about the trim link bend at 160. This motion additionally allows the slider assembly 140 to pivot laterally about the line of engagement as shown at 162 in FIG. 6 between the wall portion 154 and the edge portions of longitudinal rails 152, 152'. Such pivotal motion may be accomplished thru biasing means in the form of a resilient leaf spring 165 compressively sandwiched between the slider assembly 140 and trim link 166. With retraction of solenoid plunger 182, leaf spring 165 expands so as to laterally rotate the slider assembly 140 with respect to the trim link 166 and in this manner move the follower 156 forward to maintain it in continuous engagement within the cam 158 while at the same time moving the arresting link 142 backward into the locus of travel of striker pin 138. As is readily apparent, such lateral rotation of the slider assembly 140 with respect to the trim link 166 is made possible by an extended length arm portion 168 of the stop link 146 which arm portion 168 extends laterally outward from a downwardly extending integral leg portion 144 of the slider assembly 140 with ultimate lateral rotation being determined by the upturned portion of link 146 engaging the longitudinal edge of slot 150. Additionally, it will be readily appreciated that the longitudinal rails 152, 152' only loosely fit between wall portion 154 and respective tangs, 148, 148' in order to permit the aforementioned lateral rotation. Conversely, de-energization of solenoid 180 permits trim link 166 to spring forward against the back surface of focus wheel 124 thus compressing leaf spring 165 so as to laterally rotate slider assembly 140 and its associated arresting link 142 out of the locus of travel of striker pin 138.

To permit the control circuit of the exposure control system to de-energize solenoid 180 as early as possible in a photographic cycle, the forward tip of follow-focus striker pin 138 extending from walking beam 34 is formed to define a V shaped slot or groove 136. Accordingly, following the establishment of an appropriate aperture in consequence of the abutment of striker pin 138 against the arresting link 142 of slider assembly 140, solenoid 180 may be de-energized and the tip groove 136 and arresting link 142 will remain mechanically captured. This captured status is retained until such time as shutter-aperture solenoid 62 is energized to terminate an exposure interval. Upon such terminating energization, walking beam 34 is rotated to release the mechanical capture between tip groove 136 and link 142 and thus permit trim link 166 to return slider assembly 140 to its retracted position.

Figure 10:
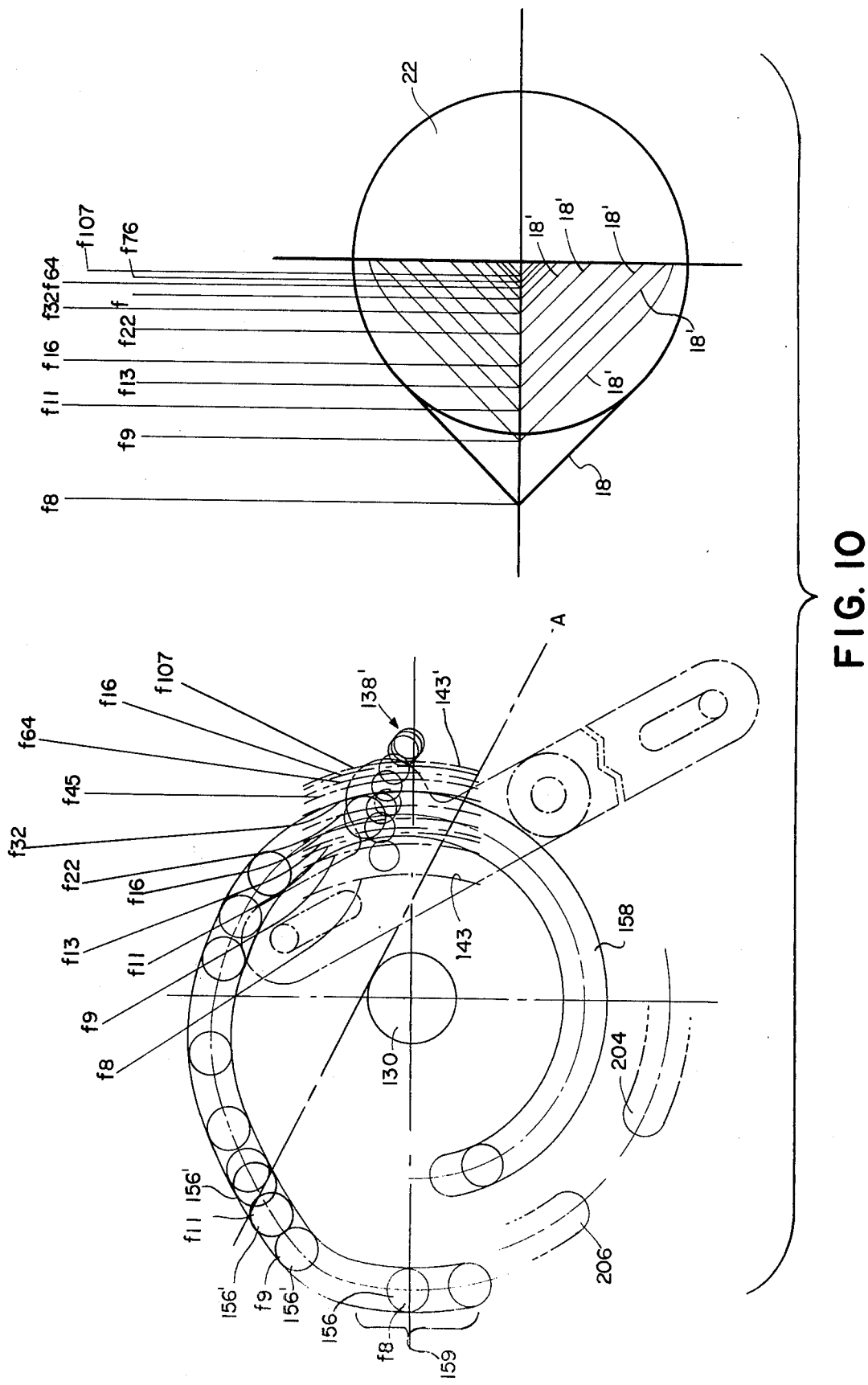
FIG. 10 is a schematic view of the follow-focus mechanism of the invention as well as the aperture of the exposure control mechanism thereof illustrating the performance thereof.

Looking to FIG. 10, the mechanical and geometric interrelation on the face groove cam 158, slider assembly 140, arresting link 142 and the half portion of aperture 22 defined by shutter-aperture blade 18 are portrayed in detail. Cam follower 156 is slidably supported by slider assembly 140 upon trim link 166 which is positioned for rotation with respect to housing 12 by rivet or screw 189 located apart from the center of rotation of focus wheel 124. Rotation of focus wheel 124 moves the grooved cam 158 to drive the slider assembly 140 imparting a rectilinear motion thereto along an elongated linear pathway or guideway as defined by the longitudinal rails 152 and 150' in cooperation with the slot 150. This elongated pathway is represented generally by the axis A with the orientation thereof being established by the position of trim link 166. The rectilinear motion imparted to the slider assembly 140 operates along a plane substantially normal to the optical path 22 and positions the forward edge 143 of arresting link 142 to halt striker pin 138 of walking beam 34 at selected orientations. In the orientation shown at F/8 on the subject drawing, link 142 is positioned to establish a fully open aperture. Other positions of arresting link edge 143 serving to arrest pin 138 establish progressively diminishing apertures up to about F/107 are shown at 143'. Similarly, the positions at which striker pin 138 is intercepted for these diminishing aperture sizes are shown as circles at 138'. The locus of travel of pin 138 as illustrated by the series of circles at 138' describes a segment of a circle, the center of which coincides with the center of rotation of walking beam 34.

Relative positions of follower pin 156 within cam 158 for various focal adjustments of focus wheel 124 are identified at 156'. These serially disposed positions of pins 156' about cam 158 follow the same F-number sequence identified in connection with forward arresting link edge positions 143' as well as with the serially disposed positions 18' of shutter-aperture blade 18. It should be understood, of course, that the position identifications of pin 156 shown at 156' are those with respect to cam control source 158 as opposed to focus wheel position. In other words, the position of pin 156 changes only along axis A except during trim adjustment as will be subsequently described.

Note that cam 158 is configured to provide a dwell portion 159 at which a continuous maximum aperture (shown as F/8) is established. This portion of the focusing range represents subject distances from infinity to the practical output range of the source of artificial illumination being used. As this effective range is reached, the cam 158 is configured to commence to slide assembly 140 along the noted axis in a manner causing arresting link edge 143 to define progressively increasing numerical values of aperture.

A detent arrangement (not shown) may be provided for limiting the extent of rotation of focus wheel 124 as fully disclosed in U.S. Pat. No. 3,832,722, supra. The presence of this focus wheel stop arrangement assures that the follow-focus mechanism including follower pin 156 and the slider assembly 140 are not damaged due to over rotation of focus wheel 124. FIG. 2 illustrates an orientation of blades 16–18 and the follow-focus control system as they are operative during an exposure interval to establish an aperture with no trim input.

Referring to FIGS. 1, 2 and 3 the components of the exposure mechanism providing a trim function for the follow-focus aperture control are illustrated. Trim information from trim wheel 76 is mechanically transmitted to the follow-focus components through the trim link 166. This link 166 has been described earlier as determining the axis of the elongated pathway along which the slider assembly 140 and its associated arresting link 142 slide. Trim link 166 is pivotally mounted upon rear casting 12 by the rivet or screw 189 extending into a stand-off (not shown). From this pivotal connection at 189, the link 166 is formed on one side having a curvature extending over the taking lens at 22 to terminate at a tip incorporating an elongated slot 212. Slot 212 is dimensioned to slideably fit over a camming pin 214 extending backwardly from the inner face of trim wheel 76. As trim wheel 76 is manually pivoted to provide trim adjustment, camming pin 214 correspondingly is moved about an arcuate locus of travel which varies vertically. Such movement of pin 214, in turn, imparts a pivoting movement to trim link 166 about rivet 189. This same movement is, in turn, witnessed at the slider assembly 140 as well as the arresting link 142. Such movement serves to rotate slider assembly 140 in a manner changing the angle of the axis of the elongated pathway along which the slider assembly 140 slides. Accordingly, the resultant rotation of assembly 140 causes the position of arresting link 142 to be selectivey advanced or retarded in its aperture defining position therewithin. The response of the follow-focus system to lens focusing can be adjusted or trimmed by a select exposure value through a simple manipulation of trim wheel 76.

An important aspect of this adjustment resides in the feature that a given alteration of exposure value inserted by the trim system (preferably ±1.5 F/stops) will be substantially valid for any focal setting. This consistency of exposure adjustment for the trim system stems in part from the fact that the axis A of the elongated pathway along which the slider assembly 140 slides when the trim setting is in the neutral position as shown in FIG. 2 is selected to intersect the horizontal baseline as shown at 13 of casting 12 at an angle of approximately 14°. This angle is determined empiracally by a method to be subsequently described in more detail.

A trim setting beyond the neutral position is shown in FIGS. 1 and 3 wherein a comparison of the trimmed components with the neutral position components of FIG. 1 illustrates that the axis of the elongated pathway along which the assemby 140 slides on trim link 166 changes with respect to the horizontal baseline 13 so as to intersect the horizontal baseline 13 at either a greater angle as shown by the intersection of Axis A' in FIG. 1 or a smaller angle as shown by the intersection with axis A'' in FIG. 3.

Referring specially to FIG. 1, there is shown the trim position assumed when the aperture size is decreased in order to darken the exposure. As is readily apparent, the axis A' of the elongated pathway along which the slider assembly 140 slides on trim link 166 is rotated in a clockwise direction so as to intersect the horizontal baseline 13 at an angle greater than that intersected in the neutral position. This rotation in turn operates to move the cam follower 156 along the grooved cam 158 so as to impart a rectilinear motion to the slider assembly 140 in the direction of decreasing aperture. This motion ultimately positions the linear forward edge 143 of arresting link 142 to halt strike pin 138 of walking beam 34 at a select location substantially corresponding precisely to a 1½ F/stop decrease in the aperture size from the neutral position.

Conversely there is shown at FIG. 3 the trim position assumed when the aperture size is increased in order to lighten the exposure. Again, as is readily apparent, the axis A'' of the elongated pathway along which the slider assembly 140 slides on trim link 166 is rotated in a counter-clockwise direction so as to intersect the horizontal baseline 13 at an angle less than that intersected in the neutral position. This rotation in turn operates to move the cam follower 156 along the grooved cam 158 so as to impart a rectilinear motion to the slider assembly 140 in the direction of increasing aperture. This motion ultimately positions the linear forward edge 143 of arresting link 142 to halt striker pin 138 of walking beam 34 at a select location substantially corresponding preferably to a 1½ F/stop increase in the aperture size from the neutral position.

As is now readily apparent, the trim wheel 76 operates to vary the location of the axis of the elongated pathway along which the slider assembly 140 slides on trim link 166 while simultaneously moving the cam follower 156 along the grooved cam 158 in order to impart rectilinear motion to the slider assembly 140. Thus the movement of the slider assembly 140 is determined solely by its connection to the trim link 166 and by the movement of the cam follower 156 along the grooved cam 158 without any further connection being provided between the slider assembly 140 and rear casting 12. In this manner a near uniform correlation can be maintained between changes in trim setting and aperture size regardless of the actual focus setting.

By way of example, it has been found preferable to locate the axis along which the slider assembly 140 slides on the trim link 166 during the minimum aperture trim setting along a line substantially parallel to the horizontal baseline 13. In this manner adjustment of the trim wheel 76 and trim link 166 will always operate to move the follower 156 over a sloped portion of the grooved cam 158 regardless of the focus wheel 124 setting. Additionally, this arrangement will also result in a near uniform change from the neutral aperture setting of either plus or minus 1½ F/stops for each extreme adjustment of the trim wheel 76 regardless of the follow-focus aperture setting. It will additionally be appreciated that this uniform trim control can be accomplished without a second cammed surface along the edge 143 of arresting link 142 as was heretofore required in prior art follow focus systems.

Referring back to FIG. 4, it will be seen that arresting link 142 is adjustably connected to assembly 140 by an adjusting screw 216. The head of screw 216 is peripherally slotted at 218 and slidably engages a corresponding slot 220 formed in an integral flange member 222 extending laterally from arresting link 142. The opposite end of arresting link 142 includes a hooked portion 224 which slidably engages a corresponding slot 226 in slider assembly 140. The location of edge 143 of arresting link 142 relative to the slider assembly 140 may now be finely adjusted by screw 216 in order to compensate for the cumulative effect of dimensional variations within prescribed tolerances of the individual components. Such an adjustment is particularly critical if the exposure system is to be economically mass produced. Rotation of the adjusting screw 216 operates to move integral flange 220 and its arresting link edge 143 in a vertical direction in a manner which, as is readily apparent, shifts the location of edge 143 relative to the slider assembly 140. This shift in the arresting link edge 143 location is a direct result of the angular orientation of edge 143 with respect to the direction of screw adjustment.

As described earlier, movement of trim wheel 76 also serves to selectively position an optical wedge 74 over the light sensing element of an exposure control system. As a consequence, any exposure value inserted as a trim from trim wheel 76 is simultaneously inserted into the follow-focus control system as well as into the ambient exposure control system. This arrangement is advantageous where the trim is inserted to accommodate for minor speed variations occasioned in the manufacture of the film being used with the photographic apparatus.

Since certain changes may be made in the above-described system and apparatus without departing from the scope of the invention herein involved, it is intended that all matter contained in the description thereof or shown in the accompanying drawings shall be interpreted as illustrative and not in a limiting sense.

What is claimed is:

1. Apparatus for a camera defining a film plane and including a housing and an objective lens mounted on said housing, said apparatus comprising:
   means for adjusting the objective lens to accomodate its focusing at the camera's film plane images of scenes located at different distances from the camera;
   means for controlling the amount of scene light incident on the film plane, said scene light controlling means including a blade assembly movable along a predetermined path to define a range of apertures through which scene light must pass in reaching the film plane;
   means, responsive to the operation of said adjusting means, for determining maximum aperture size from said range of aperture sizes whereby said maximum aperture size corresponds to the distance a particular scene being photographed is positioned from the camera, said maximum aperture size determining means including means for defining an elongated pathway and a slider mounted to slide along said elongated pathway responsive to the operation of said adjusting means and arranged to control the movement of said blade assembly along its said predetermined pathway; and
   means for selectively trimming the response of said aperture size determining means to the operation of said adjusting means, said trimming means including means for changing the orientation of said elongated pathway relative to said housing independent of the operation of said adjusting means and solely dependent upon the operation of said trimming means, said changing of the orientation of said elongated pathway in combination with said maximum aperture size selecting means effecting a displacement of said slider along said elongated pathway for any given consideration of said adjusting means.

2. The photographic apparatus of claim 1 wherein said means for changing the orientation of said elongated pathway relative to said housing includes a trim link connecting said elongated pathway defining means and selectively rotatable about a pivot point in fixed relation relative to said housing to change the angle of said elongated pathway along which said slider means is translatably disposed by predetermined number of degrees substantially corresponding to a predetermined change in aperture regardless of the adjusted position of said adjusting means.

3. The photographic apparatus of claim 1 wherein said slider is connected to lateral pivotal relationship with respect to said elongated pathway so as to selectively pivot laterally away from said elongated pathway into said predetermined pathway along which said blade assembly moves.

4. The photographic apparatus of claim 3 wherein said means for changing the orientation of said elongated pathway relative to said housing includes a trim link connecting said elongated pathway defining means and selectively rotatable about a pivot point in fixed relation relative to said housing to change the angle of said elongated pathway along which said slide means is translatably disposed and said elongated pathway means includes rail means in spaced relation to an elongated slot which together cooperatively define said elongated pathway along which said slider is translatably disposed in a manner to accomodate selective lateral pivoting of said slider about said rail means and away from said elongate slot into said predetermined pathway along which said blade assembly moves.

5. A photographic apparatus of the type adapted for selective use with a source of artificial illumination having a predetermined output intensity characteristic comprising:
   lens means adjustable to focus the image of a photographic subject positioned a given distance therefrom along an optical path at an image plane;
   focusing means movable between one terminus representing a distant focus and another terminus representing a nearest focus for adjusting said lens means;
   exposure mechanism means having at least one element movable along a locus of travel and defining a range of apertures over said optical path when said element is moved;
   slider means selectively movable into said exposure mechanism means locus of travel and translatably positionable along an elongated pathway for halting said element thereof at locations wherein said exposure mechanism means defines select exposure apertures;
   means movable in correspondence with said focusing means movement for positioning said slider means in accordance with the distance at which said photographic subject is positioned from said lens means;
   drive means for selectively moving said slider means into said locus of travel; and
   trim means defining said elongated pathway along which said slider means is translatably disposed, said trim means being selectively movable independent of said focusing and follower means for angularly shifting said elongated pathway in a manner which operates to change the position of said slider means at which said exposure mechanism element is halted, thus adjusting the select exposure aperture.

6. The photographic apparatus of claim 5 wherein said trim means includes a trim link which defines said elongated pathway and is selectively rotatable about a fixed point of pivot to change the angle of said elongated pathway along which said slider means is translatably disposed by a predetermined number of degrees substantially corresponding to a predetermined change in exposure aperture regardless of the adjusted position of said focusing means.

7. The photographic apparatus of claim 5 wherein said slider means is connected to lateral pivotal relationship with respect to said elongated pathway so as to pivot laterally away from said elongated pathway into said locus of travel of said exposure mechanism means upon actuation of said drive means during a photographic cycle.

8. The photographic apparatus of claim 7 wherein said trim means includes a trim link selectively rotatable about a fixed point of pivot; said trim link additionally including rail means in spaced relation to an elongate slot which together cooperatively define said elongated pathway along which said slider means is translatably disposed in a manner so as to accomodate lateral pivoting of said slider means about said rail means and away from said elongate slot into said locus of travel of said exposure mechanism means.

9. The photographic apparatus of claim 7 wherein said means for positioning said slider means includes a cam means movable in correspondence with said focusing means movement and having a control surface contactable with a cam follower from said slider means; said cam follower being configured and arranged for continuous positive driving contact with said cam means regardless of said drive means actuation or lateral pivotal movement of said slider means with respect to said elongated pathway.

10. The photographic apparatus of claim 5 wherein said trim means includes a resilient trim link connected for selective rotation about a fixed point of pivot and configured to provide a positive bias operative on said elongated pathway and its associated slider means for biasing said slider means wherein said bias may be overcome through actuation of said drive means.

11. The photographic apparatus of claim 10 wherein said slider means is connected and biased to pivot laterally away from said elongated pathway into said locus of travel of said exposure mechanism means upon acutation of said drive means to override said resilient trim link bias during a photographic cycle.

12. The photographic apparatus of claim 11 wherein said means for positioning said slider means includes a cam means movable in correspondence with said focusing means movement and having a control surface contactable with a cam follower from said slider means, and wherein said resilient trim link includes rail means in spaced relation to an elongated slot which together cooperatively define said elongated pathway along which said slider means is translatably disposed in a manner so as to accomodate lateral biased pivoting of said slider means away from said elongate slot into said locus of travel of said exposure mechanism means upon actuation of said drive means to move said resilient trim link against its associated bias while at the same time accomodating lateral biased pivoting of said slider follower to maintain continuous contact between said follower and cam means regardless of said drive means actuation of said resilient trim link against its associated bias.

13. The photographic apparatus of claim 11 wherein said drive means includes a tractive electromagnetic device stationary with respect to said means for positioning said slider means and trim link, and slidably engaged to said trim link for moving said trim link in opposition to its associated positive bias while still accomodating selective pivotal movement of said trim link about its fixed point of pivot wherein actuation of said tractive electromagnetic device operates to move said resilient trim link against its associated bias while at the same time accomodating lateral pivoting of said slider means about said elongated pathway with said locus of travel of said exposure mechanism means.

14. The photographic apparatus of claim 11 including:
  means selectively actuable for automatically controlling said exposure mechanism in accordance with the ambient light level of a scene being photographed;
  ambient trim means for selectively varying said automatic exposure mechanism control by a predetermined value of exposure; and
  manually adjustable trim control means for simultaneously pivoting said trim link about its fixed point of pivot while at the same time adjusting said ambient trim means to provide said predetermined variation of exposure value.

15. The photographic apparatus of claim 5 wherein said slider means includes an arresting link adjustably connected thereto in a manner whereby its forward linear edge of selectively movable into the locus of travel of said exposure mechanism means for interception thereof and whereby the position of said arresting link forward edge may be manually adjusted relative to said slider means to compensate for the cumulative effect of dimensional variations within the prescribed tolerances of the individual components.

16. The photographic apparatus of claim 15 wherein said arresting link is connected to said slider means by an adjusting screw, the head portion of which is peripherally slotted for slidable engagement with a corresponding slot formed within an integral flange extending laterally from said arresting link wherein said arresting link additionally includes a hooked portion for sliding engagement within a corresponding slot in said slider means.

17. A photographic apparatus of the type adapted for selective use with a source of artificial illumination having a predetermined output intensity characteristic comprising:
  means defining an optical path including an optical objective adjustable to image a photographic scene at an image plane;
  focusing means movable to adjust said optical objective;
  exposure means having at least one element movable along a locus of travel and defining a range of apertures on said optical path in correspondence with said element movement;
  means defining an elongate guideway;
  slider means having a slider assembly translatable along said elongate guideway and laterally pivotable about an axis substantially perpendicular to said guideway to selectively move into said locus of travel to arrest said element so as to define a select aperture value over said optical path;
  means movable in correspondence with said focusing means movement for positioning said slider assembly at locations along said locus of travel defining a select exposure aperture corresponding with the distance at which said photographic subject is positioned from said optical objective; and
  drive means for selectively moving said slider means into said locus of travel during a photographic cycle of said apparatus.

18. The photographic apparatus of claim 17 wherein said means for positioning said slider assembly includes a cam means movable in correspondence with said focusing means movement and having a control surface contactable with a cam follower from said slider means; said cam follower being configured and arranged for continuous positive driving contact with said cam means regardless of said drive means actuation or lateral pivotal movement of said slider assembly with respect to said guideway.

19. The photographic apparatus of claim 17 wherein said guideway is defined by a resilient link configured to provide a positive bias operative on the area of said guideway and its associated interceptor assembly for biasing said interceptor assembly out of the locus of travel of said exposure means wherein said bias may be overcome thru actuation of said drive means.

20. The photograpic apparaus of claim 19 wherein said slider assembly is connected and biased to pivot laterally away from said guideway into said locus of travel of said exposure means upon actuation of said drive means to override said resilient guideway link bias during a photographic cycle.

21. The photographic apparatus of claim 20 wherein said guide means includes a cam means movable in correspondence with said focusing means movement and having a control surface contactable with a cam follower from said slider assembly, and wherein said resilient guideway link includes rail means in spaced relation to an elongate slot which together cooperatively define said guideway along which said slider assembly is translatably disposed in a manner so as to accomodate lateral biased pivoting of said slider means about said rail means and away from said elongate slot into said locus of travel of said exposure means upon actuation of said drive means to move said resilient guideway link against its associated bias while at the same time accomodating lateral biased pivoting of said slider follower to maintain continuous contact between said follower and cam means regardless of said drive means actuation of said resilient guideway link against its associated bias.

22. The photographic apparatus of claim 20 wherein said drive means includes a tactive electromagnetic device, stationary with respect to said means for positioning said slider assembly and guideway link for moving said guideway link in opposition to its associated positive bias.

23. The photographic apparatus of claim 17 wherein said slider assembly includes an arresting link adjustably connected thereto in a manner whereby its forward linear edge is selectively movable into the locus of travel of said exposure mechanism means for interception thereof and whereby the position of said arresting link forward edge way be manually adjusted relative to said slider assembly to compensate for the cumulative effect of dimensional variations in the individual components.

24. The photographic apparatus of claim 23 wherein said arresting link is connected to said slider assembly by an adjusting screw, the head portion of which is peripherally slotted for slidable engagement with a corresponding slot formed within an integral flange extending laterally from said arresting link wherein said arresting link additionally includes a hooked portion for sliding engagement within a corresponding slot in said slider means.

25. A photographic apparatus of the type adapted for selective use with a source of artificial illumination having a predetermined output intensity characteristic comprising:
means defining an optical path including an optical objective adjustable to image said scene at an image plane;
focusing means movable to adjust said optical objective;
exposure mechanism means movable along a locus of travel to define a progressive variation of exposure apertures over said optical path;
means defining an elongated guideway;
slider means having a slider assembly including an arresting link adjustably connected thereto wherein said slider assembly and its associated arresting link are selectively movable into said exposure mechanism means locus of travel and translatably positionable along said elongated guideway so that said arresting link can halt movement of said exposure mechanism means at locations defining select exposure apertures;
means movable in correspondence with said focusing means movement for positioning said arresting link in accordance with the source of artificial illumination anticipated at said photographic subject; and
drive means for selectively moving said arresting link into said locus of travel during a photographic cycle of said apparatus.

26. The photographic apparatus of claim 25 wherein said arresting link is connected to said slider assembly by an adjusting screw, the head portion of which is peripherally slotted for slidable engagement with a corresponding slot formed within an integral flange extending laterally from said arresting link wherein said arresting link additionally includes a hooked portion for sliding engagement within a corresponding slot in said slider means.

27. Apparatus for a camera defining a film plane and including a housing and an objective lens mounted on said housing, said apparatus comprising:
means for adjusting the objective lens to accommodate its focusing at the camera's film plane of images of scenes located at different distances from the camera;
means for controlling the amount of scene light incident on the film plane, said scene light controlling means including a blade assembly movable along a predetermined path to define a range of apertures through which scene light must pass in reaching the film plane;
means, responsive to the operation of said adjusting means, for determining a maximum aperture size from said range of aperture sizes whereby said determined maximum aperture size corresponds to the distance a particular scene being photographed is positioned from the camera, said maximum aperture size determining means including a cam surface coupled to said lens adjusting means to be displaced in correspondence with the operation of said lens adjusting means, a cam follower in contact with said cam surface, an interceptor operable to restrain the movement of said blade assembly along said predetermined path and means for coupling said cam follower to said interceptor, the operation of said adjusting means thus serving to change the position of said interceptor; and
means for selectively trimming said response of said aperture size determining means, said trimming means including a trim link connected to said housing for displacement with respect thereto and means coupling said trim link to said cam follower-interceptor coupling means to effect a displacement of said cam follower-interceptor coupling means in a plane substantially normal to the optical axis of the objective lens responsive to a displacement of said trim link, said cam follower-interceptor coupling means being unconnected to said housing other than through said trim link such that the movement of said cam follower-interceptor coupling means in said plane is determined exclusively by its connection to said trim link and the action of said cam surface against said cam follower and being otherwise completely unrestrained.

* * * * *